United States Patent

[11] 3,618,724

[72] Inventor Adolf Oehl
     Am Eulenrech, Germany
[21] Appl. No. 650
[22] Filed Jan. 5, 1970
[45] Patented Nov. 9, 1971
[73] Assignee General Motors Corporation
     Detroit, Mich.
[32] Priority Jan. 7, 1969
[33] Germany
[31] G 69 00 376

[54] SYNCHRONIZER DEVICES FOR STEPPED-RATIO CHANGE-SPEED GEARS FOR MOTOR VEHICLES
3 Claims, 5 Drawing Figs.

[52] U.S. Cl. ........................................... 192/53 F
[51] Int. Cl. ........................................... F16d 23/02
[50] Field of Search ................................. 192/53 F

[56] References Cited
UNITED STATES PATENTS
2,328,205  8/1943  Flinn ............................ 192/53 F
2,865,221  12/1958 Ball .............................. 192/53 F X
3,080,028  3/1963  Kennedy ........................ 192/53 F
2,022,095  11/1935 Thompson ..................... 192/53
3,192,788  7/1965  Fodrea .......................... 74/375

Primary Examiner—Allan D. Herrmann
Attorneys—W. E. Finken and A. M. Heiter

ABSTRACT: A synchronizer device for stepped-ratio change-speed gears of a motor vehicle utilizes blocker rings (baulk rings) for delaying positive-clutch engagement of a slidable coupling sleeve until a pair of rotary transmission parts to be coupled together approach synchronism. To prevent small axial movements of the blocker rings which should give rise to noise in certain circumstances, an annular spring between each blocker ring and a first rotary transmission has a free end which is shaped to exert an axially outward bias on the respective blocker ring such that the blocker ring is thereby maintained in continuous clearance-free contact with a second rotary transmission part.

Inventor
Adolf Oehl
BY
A. M. Heiter
Attorney

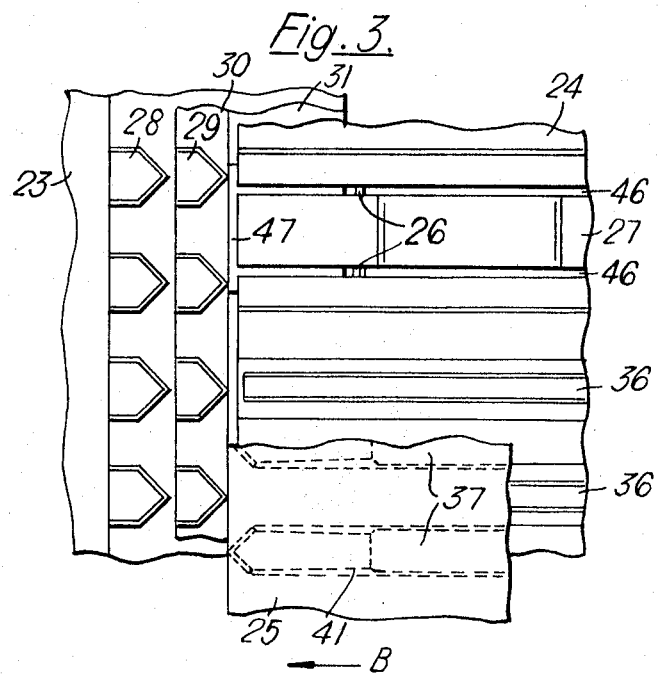
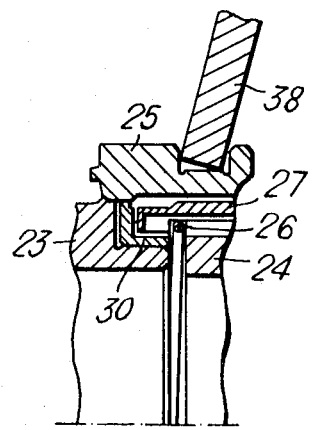

SYNCHRONIZER DEVICES FOR STEPPED-RATIO CHANGE-SPEED GEARS FOR MOTOR VEHICLES

This invention relates to synchronizer devices for stepped-ratio change speed gears for motor vehicles. Specifically such synchronizer device as utilize blocker rings for delaying positive-clutch engagement of a slidable coupling sleeve until a pair of rotary parts to be coupled together approach synchronism.

Blocker ring synchronizer devices are so designed that the blocker ring is able to move to a small extent in an axial direction. Consequently, if the vehicle is being driven under certain conditions of temperature, the blocker ring tends to give rise to noise when the two rotary transmission parts are not coupled together by way of the coupling sleeve.

An object of the present invention is to construct a blocker ring synchronizer device which avoids The above-mentioned undesirable tendency of the blocker ring to give rise to noise.

Another object of the present invention is to keep the blocker ring and a second rotary transmission part in continuous clearance-free contact, in a simple and yet reliable manner.

A further object of the present invention is to ensure that, even after long term usage of the synchronizer device, the blocker ring can, with a slight effort only, be bought into clearance-free, almost frictionless contact with the second rotary transmission part. In the drawings:

FIG. 3 is a fragmentary view showing (partially overlapping) a coupling sleeve, a first rotary transmission part, a blocker ring and third rotary transmission part;

FIG. 4 is a fragmentary section of the left-hand upper part of the synchronizer device shown in FIG. 1 with a differently shaped coupling sleeve.

Figure 1:
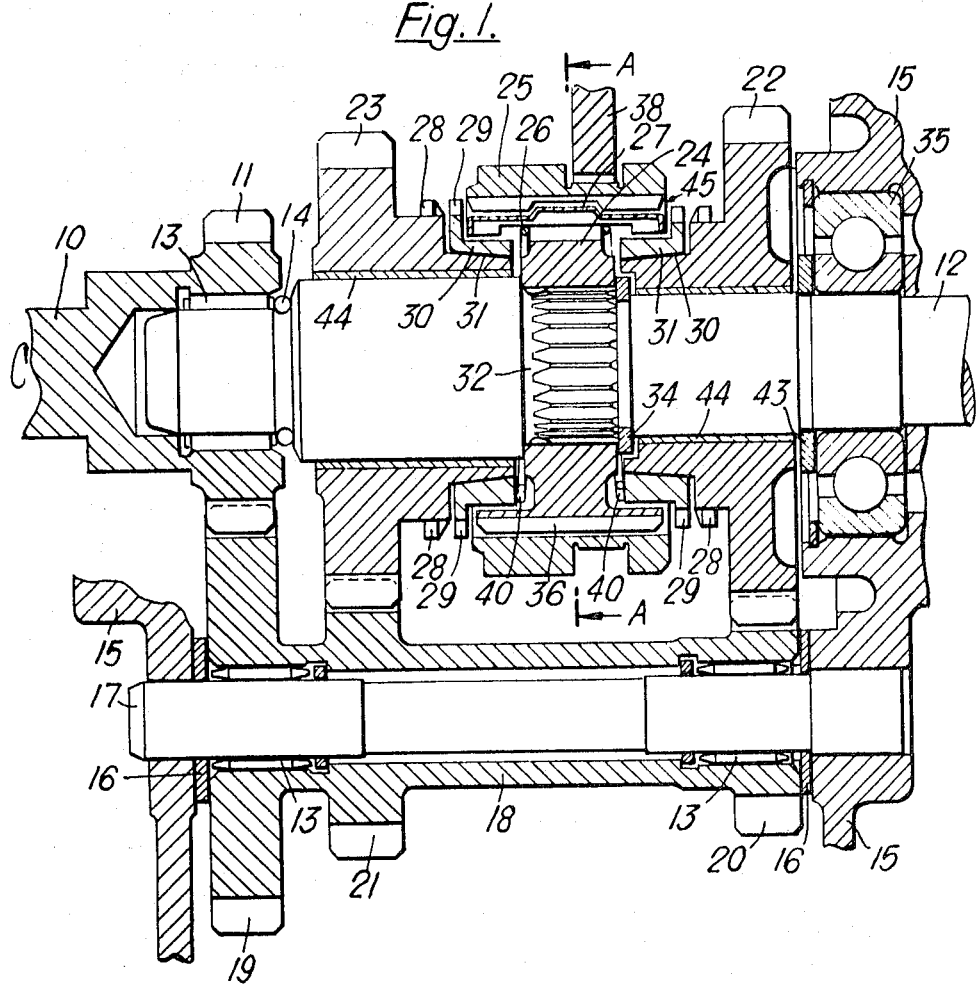
FIG. 1 is a longitudinal section through a stepped-ratio change speed gear incorporating one embodiment of a synchronizer device in accordance with the present invention.
Figure 5:
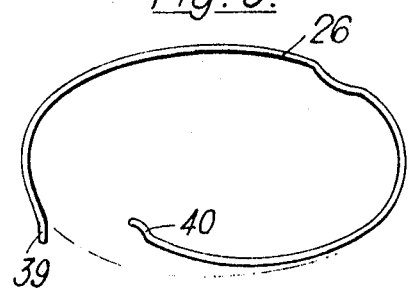
FIG. 5 is a perspective of a ring spring of the synchronizer device shown in FIG. 1.

The change speed gear which is shown in FIG. 1 of the drawings has a rotary input drive shaft 10 for transmitting torque from the vehicle engine (not shown) to a countershaft gear cluster 18 by way of an input spur gear 11 on the drive shaft and an output spur gear 19 of the countershaft gear cluster, such that the gears 18 and 19 form a pair of intermeshing head gears. In the region of the input head gear 18 the input shaft 10 is made hollow and rotatably accommodates one end of a driven output shaft 12 by way of a needle bearing 13. The output shaft has its other end rotatably mounted in a ball bearing 25. An annular shoulder of the output shaft runs against a buffer ring 14, and an oppositely facing annular shoulder of the output shaft runs against a bearing ring 43, which abuts the inner race of the ball bearing 35, which in turn is secured in an aperture in a wall of a gear housing 15, with the outer race of the bearing retained by a snapring. The driven shaft carries, freely rotatably, third and second rotary transmission parts 22 and 23 respectively which are formed with teeth meshing with third and second output gears 20 and 21 of the countershaft gear cluster is hollow, and is by way of needle bearings 13 and between thrust washers 16, on a spindle 17 which is fixedly mounted at its ends in apertures in the walls of the gear housing 15.

The torque transmitted to the countershaft gear cluster 18 is transmitted from one of its output toothed gears 20 and 21, to one of the rotary transmission parts 22 and 23, one or other of these, as selected by the use of a coupling arrangement 45 disposed between the two rotary transmission parts, is supplied to the output shaft 12. Depending upon whether the third rotary transmission part 22 or the second rotary transmission part 23 is connected by means of the coupling arrangement to the output shaft, for a given rotary input speed the output shaft is driven at a speed which depends on the numbers of teeth of the selected toothed gear and rotary transmission part.

The coupling arrangement 45 comprises a first rotary transmission part 24 which is mounted by means of axially extending internal splines 33 on corresponding external splines 32 of a hub portion of the output shaft. Axial movement of the first rotary transmission part is prevented by abutment with a part of the output shaft carrying a bearing brush 44 for the rotary transmission part 23, and with a snapring 34 adjacent the third rotary transmission part 22, which is also mounted on a bearing bush 44. The first rotary transmission part 24 is formed with axially extending external splines 36 which engage between corresponding internal splines 37 of the axially displaceable coupling sleeve 25. The coupling sleeve 25 has an external circumferential groove which accommodates a shift fork 38 that is displaceable axially of the output shaft for producing conjoint axial displacement of the coupling sleeve.

Figure 2:
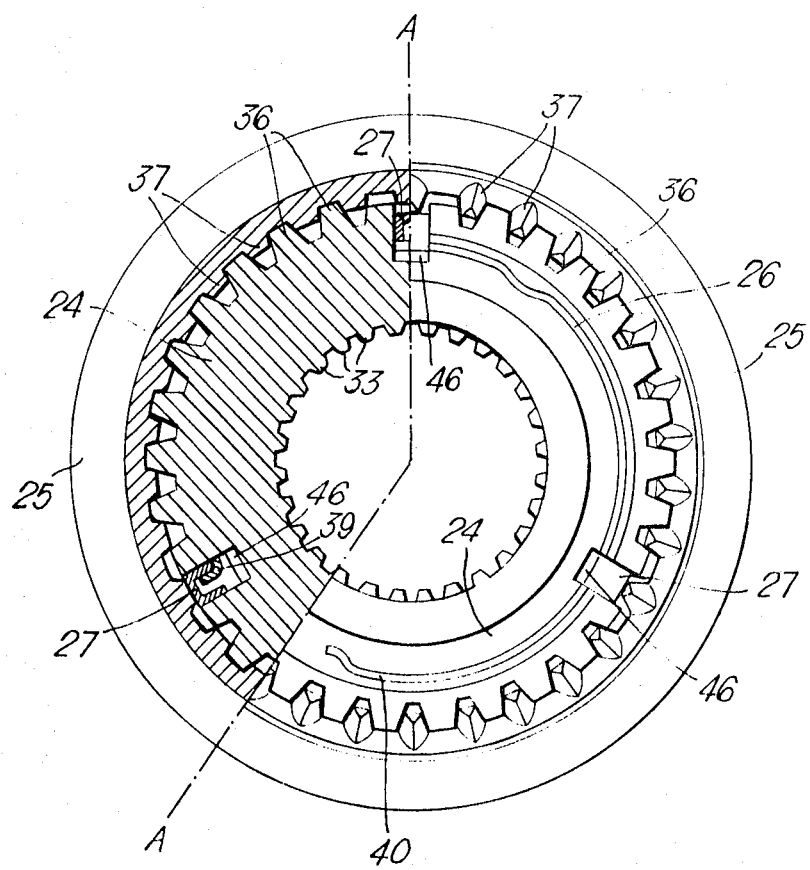
FIG. 2 shows in the left-hand part, a cross section on the line A—A of FIG. 1 sheen in the direction of the arrows, and in the right-hand part an elevation of the synchronizer device as seen in the same direction.

FIG. 2 shows, in section in the left-hand part and in elevation in the right-hand part, the internal splines 33 of the rotary transmission part 24, as well as the internal splines 37 of the coupling sleeve 25 which engage between the external splines 36. The rotary transmission part 24 has in its periphery three symmetrically arranged axial grooves 46 over its entire axial length. Movable in these axial grooves are sliders 27 whose length somewhat exceeds the axial length of the transmission part 24 and is approximately equal to the length of the internal splines 37 of the coupling sleeve 25. Facing the output shaft, the sliders have a recess extending over their entire width, but only over the major portion of their axial length. At each axial side of the transmission part 24, which is of less axial length in the region of its internal splines that in the region of its external splines 36, there is a ring spring 26 which engages in the recess of the sliders and, being secured against axial movement out of the recesses, biases the sliders in a radially outward direction against a recess in the corresponding internal spline of the coupling sleeve. Each ring spring 26 has a bent over end 39 which engages in an internal longitudinal slot of one of the sliders. The other end 40 of the ring spring 26 is extended beyond the third slider, and, as seen in the free state of the spring, is bent out of the plane of the rest of the spring.

Axially adjacent the ring springs on the side remote from the hub, are a pair of blocker rings 30 each of which is formed with a frustoconical internal surface and has three symmetrically arranged external slots 47 into which the sliders 27 extend. Moreover, at its external periphery, each blocker ring is formed with symmetrically arranged lugs 29 having the same pitch as the external splines 36 of the transmission part 24. The width of the slots in the blocker rings is such that the external splines of the transmission part 24 are able to move in the slots in a peripheral direction by somewhat less than half the pitch of the lugs, on each side of their midposition.

The blocker rings 30 are identical; their frustoconical surfaces face correspondingly shaped frustoconical surfaces 31 on the transmission parts 22 and 23. When the coupling sleeve is in a central, neutral position, both blocker rings are biased axially outwardly from the hub by means of the bent ends 40 of the respective ring springs 26, such that the blocker rings rest against the friction surfaces of the transmission parts 22 and 23 in a clearance-free manner which prevents movement of the blocker rings in an axial direction but is not capable of transmitting torque.

FIG. 3 shows the relative positions of the second rotary transmission part 23, the blocker ring 30, the first rotary transmission part 24, and the coupling sleeve 25 which must be assumed in order that the coupling sleeve can be displaced in an axial direction and thereupon interconnect the transmission parts 23 and 24 for the transmission of torque.

As is shown in FIG. 3, the lugs 29 of the blocker ring 30 align themselves with the external splines 36 of the transmission part 24. They also align themselves with teeth 28 of the transmission part 23, which have the same pitch. Each axial groove 46 of the transmission part 24 receives one of the slider 27 and reveals two portions of the ring spring 26. The internal splines 37 of the coupling sleeve 25 engage, in an axially displaceable manner, between the external splines 36, so that the coupling sleeve can be displaced axially in the direction of the arrow B, whereupon it positively interconnects the external splines 36 of the transmission part 24 and the teeth 28 of the transmission part 23.

The internal splines 37 are keystone shaped at their ends, and include chamfered portions 41, so that, when power is being transmitted, the chamfered portions bias the coupling sleeve in the direction of the arrow B, whereby the splines 37 cannot readily slip out from between the teeth 28. It is only when the amount of torque being transmitted is only slight or is zero, that the coupling sleeve can move in a direction opposite to that of the arrow B, when the shift fork 38 is operated, for disengaging the positive-clutch engagement between the transmission parts 23 and 24.

FIG. 4 shows that the sliders 27 have a raised portion in the middle, whereby, as the sliders are forced axially outwards by the ring springs, these raised portions of the sliders snap into corresponding recesses in the internal splines 27, into the position which is shown in FIG. 1.

In order to bring the transmission parts 23 and 24 into rotary synchronism, that is, to bring both transmission parts to the same rotary speed, the coupling sleeve 25 is moved to the left, by means of the shift fork 38, from the midposition illustrated in FIG. 1. The blocker ring 30 is already resting clearance-free against the friction face 31, due to the axially outward bias given by the bent end 40 of the ring spring 26 between the transmission parts 23 and 24. However, the blocker ring is not yet in torque-transmitting frictional engagement with the friction face 31.

The coupling sleeve then moves the blocker ring 30, by means of the sliders 27, into torque-transmitting frictional engagement with the transmission part 23, with the result that relative peripheral movement occurs as far as the width of the slots 47 allows. The force being applied to the coupling sleeve in the axial direction towards the transmission part 23 causes the oblique faces of the lugs 29 of the blocker ring 30 to make frictional contact with the oblique faces at the ends of the internal splines 37, thereby slowing down or accelerating the transmission part to approximately the same rotary speed as the blocker ring. Due to the continued force applied to the coupling sleeve, the blocker ring 30 moves circumferentially into a position in which its lugs 29 align themselves with the external splines 36, whereby the internal splines 37 are able to slide between the lugs 29 and into a position of force-transmitting engagement between the teeth 28.

FIG. 4 shows this shift condition in which the coupling sleeve 25 is so displaced that the raised portions of the sliders 27 no longer snap into the corresponding recesses in the internal splines 37 of the coupling sleeve.

I claim:

1. A synchronizer device for stepped-ratio change speed gears for motor vehicles, comprising; a rotary input shaft; a rotary output shaft; a first rotary transmission part fixedly mounted on one shaft; a second rotary transmission part rotatably mounted on said one shaft and having coupling means and a first annular friction surface; means for drive connecting the second rotary transmission part with the other shaft; a coupling sleeve; coupling means on the coupling sleeve and first rotary transmission part for rotary drive connecting and axially slidably mounting the coupling sleeve on the first rotary transmission part for axial movement between a disengaged and an engaged position; a blocker ring having an annular friction surface selectively movable relative to said first annular friction surface from a first position having light peripherally unbalanced frictional contact in one peripheral portion and less contact peripherally therefrom, a position not capable of transmitting significant torque into a second torque-transmitting position having peripherally balanced frictional engagement with with first annular friction surface and having blocker means to prevent coupling of the first and second rotary transmission parts by the coupling means of the coupling sleeve until the rotary speeds of these parts approach synchronism, slider means having a plurality of sliders mounted for axial movement relative to the first rotary transmission part and coupling sleeve and having resilient interlocking engagement with the coupling sleeve or axial entrainment therewith to engage the blocker ring with a predetermined axial force uniformly distributed about the perimeter of the blocker ring for peripherally balanced axial force engagement of said annular friction surfaces; and a ring spring having a main portion engaging only all of the sliders to exert an equal radially outward bias resiliently maintaining each of the sliders in an equal condition of interlocking engagement with the coupling sleeve providing a peripherally balanced large axial engagement force on the blocker ring for peripherally balanced engagement of the friction surfaces when the coupling sleeve moves from the disengaged toward the engaged position to provide the synchronism and then couple the first and second rotary transmission parts for drive, and has only a free end portion engaging the blocker ring at only one peripheral portion to provide a peripherally unbalanced small bias force on the blocker ring axially in a direction away from the first rotary transmission part toward the second rotary transmission part and into constant clearance-free light frictional contact of the friction surfaces at one peripheral portion which does not transmit significant torque when the coupling sleeve is in the disengaged position.

2. The invention defined in claim 1 and said friction surfaces being matching frustoconical friction surfaces.

3. A synchronizer device for stepped-ratio change speed gears for motor vehicles, comprising; a rotary output shaft; a first rotary transmission part fixedly mounted on the output shaft and formed with longitudinally extending external splines; a second rotary transmission part rotatably mounted on the output shaft having coupling teeth and a first frustoconical friction surface; means for constantly supplying drive torque to the second rotary transmission part; a blocker ring having a matching frustoconical friction surface axially movable relative to the first frustoconical friction surface from a first position having light frictional contact with the first frustoconical friction surface at one peripheral portion and with clearance in the peripheral direction therefrom, a position not capable of transmitting significant torque, to a second position of full peripheral frustoconical surface engagement for torque-transmitting frictional engagement and having a plurality of external lugs; a coupling sleeve axially movable from a disengaged to an engaged position formed with longitudinally extending internal splines axially slidably and rotary drive engaging the external splines on the first rotary transmission part; a plurality of sliders formed for selective interlocking engagement and axial entrainment with the coupling sleeve and engageable with the blocker ring to effect rotation with limited relative rotary movement of the blocker ring and to provide a peripherally balanced high bias force to effect the said axial movement of the blocker ring and its friction surface from said first position to the second position in frictional torque-transmitting engagement with the friction surface on the second rotary transmission part in response to movement of the coupling sleeve from the disengaged position, and a ring spring having a free end portion engaging only one peripheral portion of the blocker ring to provide when the coupling sleeve is in the disengaged position a peripherally unbalanced small bias force on the blocker ring to bias the blocker ring axially in a direction away from the first rotary transmission part toward the second rotary transmission part into constant clearance-free light frictional contact of the friction surfaces at one peripheral portion, not capable of transmitting torque, a main portion engaging only all of the sliders to exert an equal radially outward bias resiliently maintaining all of the sliders in equal interlocking engagement with the coupling sleeve operative and during axial movement of the coupling sleeve from the disengaged position toward the engagement position providing a peripherally balanced large axial engagement force on the blocker ring for peripherally balanced engagement of the friction surfaces for transmitting torque and the lugs of the blocker ring on axial movement of the coupling sleeve from the disengaged position cooperating with the internal splines of the coupling sleeve to block further axial movement of the coupling sleeve until due to the peripherally balanced high bias force engagement of the friction surfaces the rotary speeds of the first and second rotary transmission parts approach synchronism, whereupon the blocker ring permits further axial movement of the coupling sleeve into the engaged position of positive-clutch engagement of the internal splines of the coupling sleeve with corresponding external teeth of the second rotary transmission part.

* * * * *

PO-1050.
(5/69)

UNITED STATES PATENT OFFICE
CERTIFICATE OF CORRECTION

Patent No. __3,618,724__  Dated __November 9, 1971__

Inventor(s) __Adolf Oehl__

It is certified that error appears in the above-identified patent and that said Letters Patent are hereby corrected as shown below:

In the Abstract, line 6, "should" should read -- could --;
In the Specification, column 1, line 31, "sheen" should read -- seen --; column 1, line 53, "25" should read -- 35 --; column 2, line 32, "that" should read -- than --;.

Signed and sealed this 16th day of May 1972.

(SEAL)
Attest:

EDWARD M. FLETCHER, JR.
Attesting Officer

ROBERT GOTTSCHALK
Commissioner of Patents